United States Patent [19]

Mason

[11] Patent Number: 4,996,516
[45] Date of Patent: Feb. 26, 1991

[54] INDICATOR OF UNDER INFLATED TIRE

[76] Inventor: L. Dale Mason, P.O. Box 131, Buffalo, S. Dak. 57720

[21] Appl. No.: 435,595

[22] Filed: Nov. 13, 1989

[51] Int. Cl.$^5$ .............................................. B60C 23/06
[52] U.S. Cl. ................................... 340/443; 116/34 A
[58] Field of Search .................. 340/443, 438; 73/146; 116/34 A, 34 R

[56] References Cited

U.S. PATENT DOCUMENTS

| | | | |
|---|---|---|---|
| 2,452,296 | 10/1948 | Eslinger et al. | 116/34 A |
| 2,663,009 | 12/1953 | Finan | 340/443 |
| 2,990,536 | 6/1961 | Pace | 340/443 |
| 3,498,125 | 3/1970 | Sperberg | 73/146 |
| 3,572,107 | 3/1971 | Hunter | 73/146 |
| 3,984,808 | 10/1976 | Laz et al. | 340/443 |
| 4,187,495 | 2/1980 | Mitchell | 340/443 |

Primary Examiner—Joseph A. Orsino
Assistant Examiner—Brian R. Tumm

[57] ABSTRACT

An indicating device adapted to indicate a flat or severely underinflated tire. The device is activated by the enlargement in the diameter of the underinflated tire caused by centrifugal force acting on the tread, and may be especially useful on dual wheels although it will work on others as well. The device includes a contact device which will be contacted by an expanding tire. That contact tilts a switch to cause a circuit to be completed to light a signal lamp in the cab of the truck.

6 Claims, 2 Drawing Sheets

INDICATOR OF UNDER INFLATED TIRE

BACKGROUND AND SUMMARY OF THE INVENTION

This invention pertains to devices to indicate that a tire is underinflated, and more particularly to such a device operated electrically and activated by the radial enlargement of an underinflated tire caused by the centrifugal force on the rotating tire and its tread.

There have been many devices adapted to indicate the deflation of a pneumatic tire on a vehicle. Many of these use mechanical signals and nearly all of those are mounted on the wheel itself. Some use electrical devices as signals, and if those are mounted on the wheel, it is necessary to use slip rings or similar devices to conduct an electrical impulse to a signalling device in the driver's area of the car. Most also either sense a reduction of pneumatic pressure or a increase in the breadth of the tire where it touches the ground.

My invention, however, comprises a device fixed to the vehicle itself so that electrical connections can readily be made. It depends for its signaling on the fact that an underinflated tire rotating at speeds of 25 miles per hour or more actually expands in diameter because of centrifugal force on the tread. At speeds of 40 miles per hour, I have measured an increase of as much as two inches in the diameter of an underinflated truck tire. My device requires much less expansion than that, and thus provides a device convenient to install and reliable in operation. Means can be provided to signal each tire individually, or all the activating devices may be attached to a single signal.

DESCRIPTION

Figure 1:
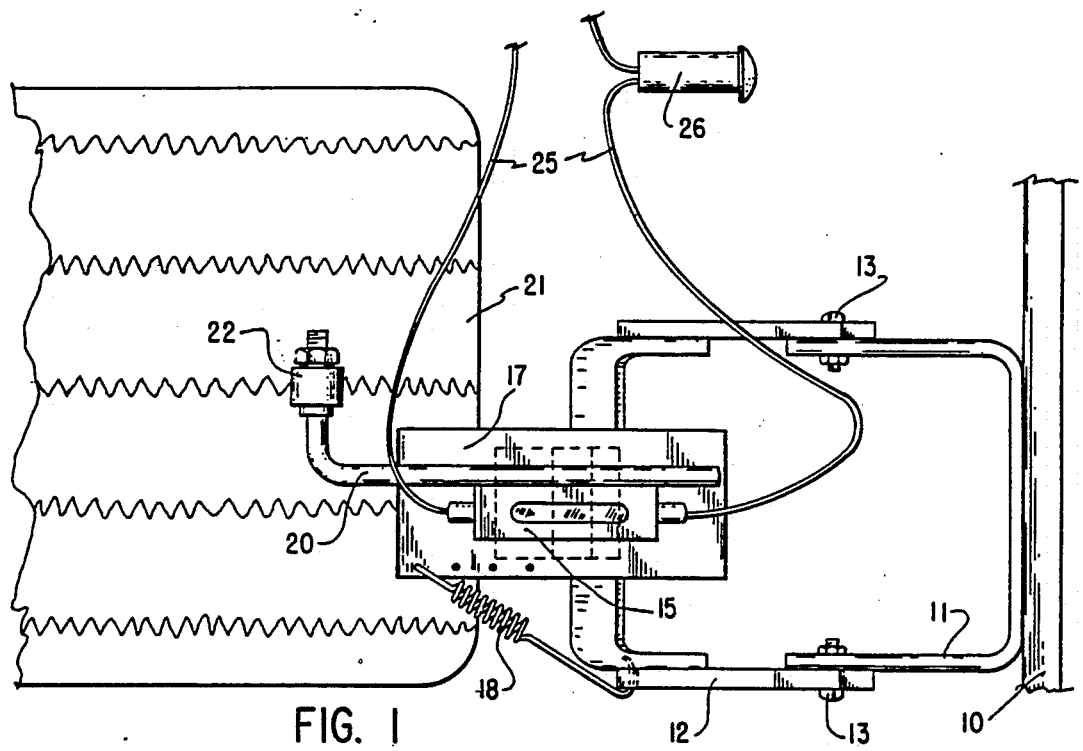
FIG. 1 is a top view of the sensing device in place adjacent a tire.

Briefly, my invention comprises a device using the expansion of an underinflated tire caused by centrifugal force, to signal the driver of a vehicle that the tire needs attention. The device is electrically activated and uses a mercury switch or similar device to close the electric circuit to provide a signal.

More specifically and referring to the figures, the operating unit is mounted to a fender support 10 or frame of the vehicle using a bracket 11. Although the support 10 is illustrated as being nearly vertical, it is clear that such supports and their orientation will vary depending on the vehicle. Because the switch depends on movement away from a normal nearly-horizontal position to close an electrical circuit, it becomes desirable to use a mounting that is somewhat adjustable. Therefore, I use a second bracket 12 adjustably fastened to the first bracket. These brackets are held together with a screw 13 extending through slots 14 formed in the legs of the second bracket.

Figure 2:
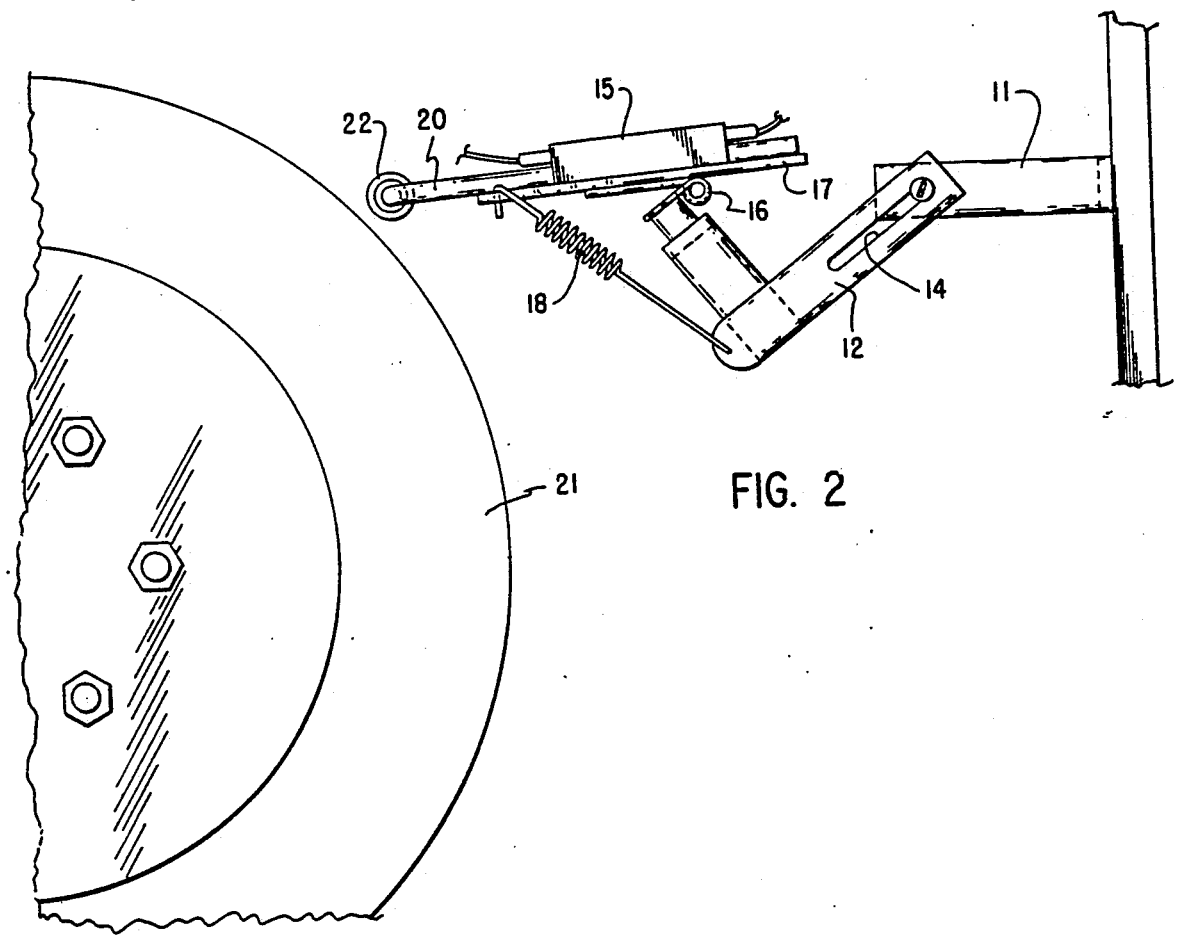
FIG. 2 is a side elevational view of the device in its normal position.

The switch 15 is attached to the second bracket 12 by means of a hinge 16. This hinge is of the type which limits movement so that it normally stops the movement of the switch and its mounting plate 17 in the normal off position shown in FIG. 2. This position should be horizontal or very nearly so in order that a mercury type switch may be used as the operating switch 15. The switch may be normally held in this position by a spring 18 engaged between the plate 17 and the bracket 12.

The operating member for the mechanism includes a bar 20 fixed to the plate 17 and extending therefrom toward the tire 21 of the vehicle. At the outer end of the bar 20, a roller 22 is rotatively attached to the bar. In the illustrated embodiment, the bar is shown as L-shaped with the roller journalled directly on the bar. However, there are obviously other ways by which the same result could ba achieved: for example, a forked end on the bar with a roller journalled on an axle between the forks.

Figure 3:
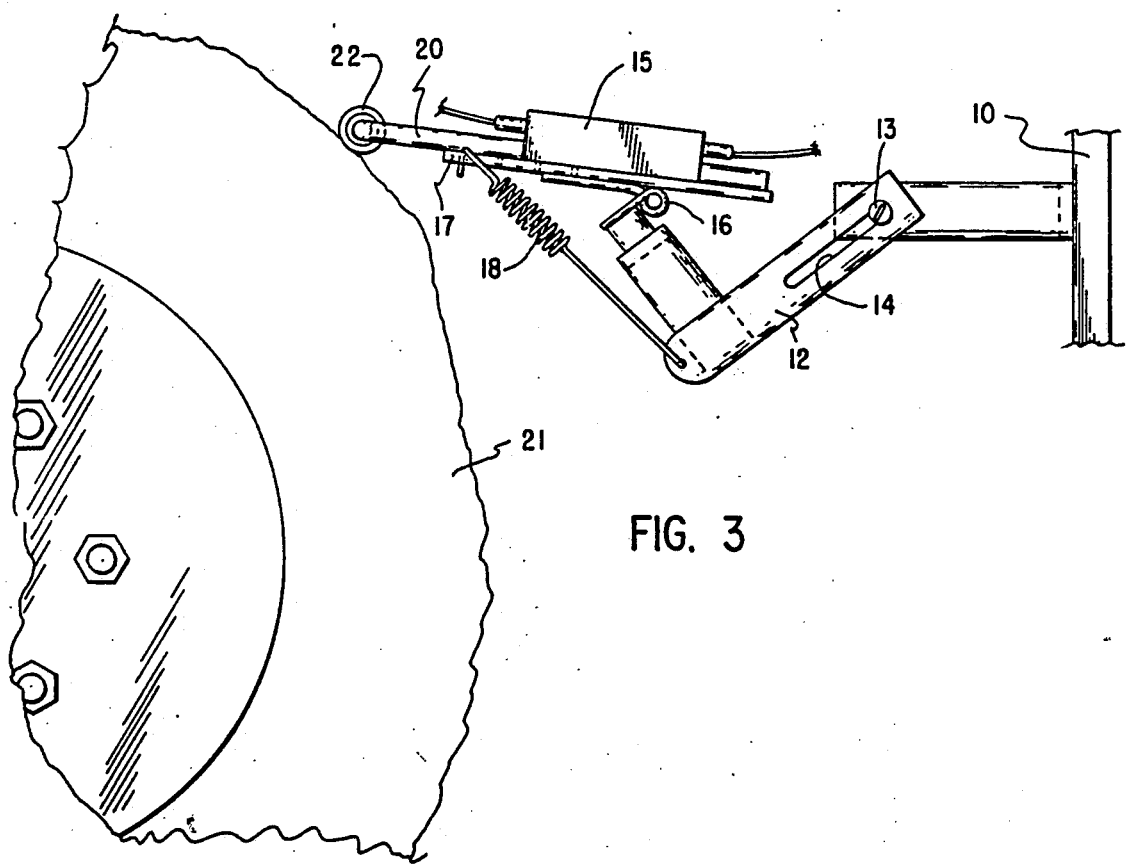
FIG. 3 is a view similar to FIG. 2 of the device in its signaling position.

In operation, the device is first properly located adjacent to the tire 21 with the switch 15 horizontal or slightly tilted so that the switch is "off". In normal use, the roller 22 is free of engagement with the tire and is spaced therefrom about one-quarter inch or more. In normal driving, there would then be no friction nor other interference with the tire. However, when the tire loses pressure, centrifugal force on the tread of the tire causes expansion of the diameter, and then, as the tread hits the roller 22, the plate 17 is caused to tilt as shown in FIG. 3. This tilting operates the mercury switch to complete a circuit from a source of power (not shown) such as the battery of the car or truck, through wires 25 to a signaling device 26 which may be a light on the dashboard of the vehicle. Thus, the driver would be warned of a tire having low pressure and the vehicle could be stopped or carefully driven to a service station. It would also appear that a tire with a tread about to separate would provide a similar expansion and thus a signal so that some prior warning of such an event might also be provided. It will be obvious that there could be a bank of lights corresponding to each tire, if desired. However, a single signal could be used to indicate a problem which then could be checked by the driver in detail.

I claim as my invention:

1. For use on a vehicle having a frame and using pneumatic tires, an indicator of tire problems comprising bracket means for attachment to said frame adjacent said tire, switch means mounted to said bracket means, engagement means connected to said switch means extending toward but normally not enaged with said tire, said engagement means adapted to sense an increase in the diameter of said tires caused by centrifugal force, and indicator means connected to said switch means to indicate the contact of said tire with said engagement means.

2. The indicator of claim 1 in which said engagement means includes a roller adapted to roll on the surface of the tread of said tire as said tire expands.

3. The indicator of claim 1 in which said bracket means is adjustable, and said switch means is a mercury switch adapted to tilt because of the contact between said engagement means and said tire as the diameter of the tire increases.

4. The indicator of claim 3 in which said switch is mounted on a plate, said plate being tiltably mounted on said bracket means by a hinge, said engagement means including a bar mounted on said plate and extending toward said tire whereby contact between said tire and said engagement means causes said switch on said plate to be tilted to activate said switch.

5. The indicator of claim 4 in which said hinge has limited motion in one direction, a spring in between said plate and said bracket means to hold said hinge in the direction of limited motion, engagement between said tire and said engagement means being effective to move said plate against the urging of said spring to tilt said switch.

6. The indicator of claim 3 in which said bracket means comprises two parts, a first part adapted to be fixed to said frame, and a second part both rotatably and slidably adjustable relative to said first part.

* * * * *